US008762988B2

(12) United States Patent
Kong et al.

(10) Patent No.: US 8,762,988 B2
(45) Date of Patent: Jun. 24, 2014

(54) USER TERMINAL DEVICE FOR MANAGING NETWORK DEVICE AND METHOD THEREOF

(75) Inventors: Tae-kook Kong, Suwon-si (KR); Jong-yoon Lim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 875 days.

(21) Appl. No.: 12/923,668

(22) Filed: Oct. 1, 2010

(65) Prior Publication Data

US 2011/0145812 A1 Jun. 16, 2011

(30) Foreign Application Priority Data

Dec. 16, 2009 (KR) ............... 2009-0125450

(51) Int. Cl.
*G06F 9/445* (2006.01)
*G06F 15/177* (2006.01)

(52) U.S. Cl.
USPC ......................................... 717/177; 715/736

(58) Field of Classification Search
USPC ........................................ 717/177; 715/736
See application file for complete search history.

(56) References Cited

U.S. PATENT DOCUMENTS

| | | | | |
|---|---|---|---|---|
| 5,394,522 A * | 2/1995 | Sanchez-Frank et al. | .... | 715/735 |
| 5,684,952 A * | 11/1997 | Stein | ............................ | 709/221 |
| 5,870,611 A * | 2/1999 | London Shrader et al. | .. | 717/175 |
| 6,031,533 A * | 2/2000 | Peddada et al. | ................ | 715/733 |
| 7,886,031 B1 * | 2/2011 | Taylor et al. | ................... | 709/221 |
| 8,291,324 B2 * | 10/2012 | Battat et al. | .................... | 715/736 |
| 2003/0200289 A1 * | 10/2003 | Kemp et al. | .................... | 709/221 |
| 2003/0233483 A1 * | 12/2003 | Melchione et al. | ........... | 709/310 |
| 2004/0223182 A1 * | 11/2004 | Minagawa | .................... | 358/1.15 |
| 2007/0174833 A1 * | 7/2007 | Im | ................................... | 717/174 |
| 2007/0234354 A1 * | 10/2007 | Hattori | ........................... | 717/177 |
| 2009/0091787 A1 | 4/2009 | Naitoh | | |
| 2009/0279113 A1 | 11/2009 | Awata | | |
| 2010/0042989 A1 * | 2/2010 | Anand et al. | ................... | 717/176 |
| 2010/0070967 A1 * | 3/2010 | Doui | .............................. | 717/173 |

FOREIGN PATENT DOCUMENTS

| | | |
|---|---|---|
| EP | 0490624 | 6/1992 |
| EP | 1840729 | 10/2007 |
| JP | 2003-241876 | 8/2003 |
| JP | 2003241925 A * | 8/2003 |

OTHER PUBLICATIONS

Andrew et al., "Generic Install Object for OS/2 Workplace Shell," IBM TDB v. 38, No. 4, Apr. 1, 1995, p. 467-468.*
Kanyuh, D., "An integrated network management product," IBM Systems Jounral, vol. 27, No. 1, 1988, 15pg.*
Extended European Search Report issued Apr. 30, 2014 in European Application No. 10195092.1.

* cited by examiner

*Primary Examiner* — Ryan Coyer
(74) *Attorney, Agent, or Firm* — Staas & Halsey LLP

(57) ABSTRACT

A user terminal device connected in a network is provided. The user terminal device includes a display to display a main user interface (UI) screen including therein a first install menu to install an application and a second install menu to install a driver, an input unit through which one of the first install menu and the second install menu is selected on the main UI screen, and a controller to carry out an application installation in which an application program is installed onto a device connected in the network, if the first install menu is selected, and carry out a driver program installation in which a driver program is installed onto the user terminal device, if the second install menu is selected. The controller causes the display to display a map image, indicative of an arrangement of devices in an environment where the network is constructed, and carries out the application program installation or the driver program installation onto the device selected from the map image.

21 Claims, 15 Drawing Sheets

FIG. 7

```
Application Installation
┌ Application Attributes To Install ─────────────
│              Application Name: [Billing Management]
│                       Version: [1.04]
│                  License Type: [90 Days Trial]
│    Compatible Platform Version: [OS 1.02]
│                        Writer: [SEC]
│
┌ Application Attributes Installed ──────────────
│              Application Name: [Billing Management]
│                       Version: [1.02]
│                  License Type: [90 Days Trial]
│    Compatible Platform Version: [OS 1.02]
│                        Writer: [SEC]
│
┌ Device Attributes ─────────────────────────
│                         Model: [CLX-1234]
│                          Name: [Jason Printer]
│                            IP: [10.1.1.2]
│    Compatible Platform Version: [OS 1.02]
│                  Manufacturer: [SEC]
│
  Overwrite?
     [ Yes ]    [ Yes for All ]    [ No ]
```

FIG. 11

| | Model Name | Types | IP Address | On/Off On/Off | Status | Operation Rate | Location | Order of Installing |
|---|---|---|---|---|---|---|---|---|
| ☑ | CLP-300 | Color Laser | 10.88.14.12 | On | Normal | 95% | A Sector, 35 Floor, R4 | 1 |
| ☑ | ML-4051 | Black/White Laser | 10.88.15.123 | On | Toner-Out | 80% | C Sector, 35 Floor, R4 | 2 |
| ☑ | SCX-2000 | Color Inkjet | 10.88.15.67 | On | Paper Jam | 85% | K Sector, 20 Floor, R3 | 3 |
| ☐ | MLX-500 | Black/White Laser | 10.87.100.1 | Off | Paper-Out | 40% | L Sector, 20 Floor, R3 | 4 |

700

710

Install 720

Remove 730

USER TERMINAL DEVICE FOR MANAGING NETWORK DEVICE AND METHOD THEREOF

CROSS-REFERENCE TO RELATED APPLICATIONS

This application claims priority benefit under 35 U.S.C. §119 (a) from Korean Patent Application No. 10-2009-0125450, filed on Dec. 16, 2009, in the Korean Intellectual Property Office, the disclosure of which is incorporated herein by reference in its entirety.

BACKGROUND

1. Field

Embodiments generally relate to a user terminal device for managing a network device and a method thereof, and more particularly, to a user terminal device for displaying a map image indicating therein an arrangement of devices connected in a network environment, and managing a network device accordingly, and a method thereof.

2. Description of the Related Art

Electronic appliances today have been increasingly diversified thanks to the development of electronic technologies. It is very common that users own a number of electronic devices in their offices or homes, and connect those devices by networks for more efficient use thereof.

By way of example, since image forming apparatuses such as printers, copiers, multi-function units, or scanners are used less frequently than personal computers, the devices are connected by a network and shared, instead of being installed for every member of the office. Such way of networking is applied to not only the image forming apparatuses, but also many other devices.

Accordingly, a user of a terminal device in a network can use a plurality of devices connected in the same network by installing corresponding driver programs on his terminal device or installing a corresponding application onto a target network device he intends to use.

However, in the abovementioned case, the user has inconvenience of having to check the target device and input required information, or go to the target device and install necessary program thereon.

The abovementioned inconvenience experienced in the installation of program particularly increases in the large network environment which involves a lot of devices and users.

Accordingly, a need arises for a method which enables a user to check locations or information of each network device easily, and to manage and manipulate the entire network devices more efficiently and conveniently.

SUMMARY

One or more embodiments provide a user terminal for providing a user a user interface (UI) screen indicating a map image therein so that the user can use devices on the network conveniently and efficiently, and a method of network device management thereof.

The foregoing and/or other aspects and utilities of one or more embodiments may be achieved by providing a user terminal device connected in a network, which may include a display to display a main user interface (UI) screen including therein a first install menu to install an application program and a second install menu to install a driver program, an input unit through which one of the first install menu and the second install menu is selected on the main UI screen, and a controller to carry out an application installation in which the application program is installed onto a device connected in the network, if the first install menu is selected, or carry out a driver program installation in which the driver program is installed onto the user terminal device, if the second install menu is selected. The controller controls the display to display a map image, indicative of an arrangement of devices in an environment where the network is constructed, and carries out the application program installation or the driver program installation onto the device selected from the map image.

The controller controls the display to display a first UI screen including therein a map image field having the map image indicated therein, and an application information field, if the first install menu is selected, and if a device is selected from the map image and an application program is selected from the application information field through the input unit, transmits the selected application program to the selected device.

The map image includes a device image which is indicated at a location where each corresponding device is installed under a network environment, and a menu provided at one side of the device image to indicate information about the corresponding device.

If one of the devices on the map image and one of the application programs on the application information field are dragged and dropped into a device image or an application program on the other field, the controller determines that the corresponding device and the corresponding application program are selected, and therefore, transmits an application program corresponding to the selected application information to the selected device.

If the selected application program is already installed in the selected device, the controller generates a UI window to inquire about an intention to proceed installation of an application program, and causes the display to display the generated UI window.

If a device image is selected from the map image, the controller inactivates displaying status of a non-installable application program among the application programs indicated in the application information field, and if an application program is selected from the application information field, the controller inactivates displaying status of a non-installable device among the devices indicated on the map image, in which the non-installable application program is an application program which is not installable onto the selected device, and the non-installable device is a device onto which the selected application program can not be installed.

The user terminal device may additionally include a storage unit to store program compatibility information therein, and wherein the controller determines a possibility of installing each application program onto each device, using the program compatibility information stored in the storage unit.

The user terminal device may additionally include a storage unit, and wherein the controller controls the display to display a second UI screen including the map image therein, if the second install menu is selected, and if a device is selected from the map image on the second UI screen, installs a driver program corresponding to the selected device to the storage unit.

The second UI screen displays an information collect field to collect information about a device selected through the map image, and if the information collect field is selected, the controller controls a list of the device information collected in the selected information collect field to be displayed, and if information about at least one device is selected from the list, the controller receives from an external server at least one driver program which corresponds to the selected information about at least one device.

The list may comprise at least one of: a name, a type, an IP address, a current status, a location, and an order of installing, regarding the device selected from the map image.

The order of installing the device selected from the map image is changeable by a user.

The information about the device on the map image is collected into the information collect field by a drag-and-drop manner.

The main UI screen may additionally include a map image construct menu to construct the map image.

The foregoing and/or other aspects and utilities of one or more embodiments may be achieved by providing a method of a user terminal device connected in a network for managing a network device, which may include displaying a main user interface (UI) screen indicating therein a first install menu to install an application program and a second install menu to install a driver program, carrying out an application installation of the application program if the first install menu is selected, and carrying out a driver installation of the driver program if the second install menu is installed. The carrying out of the application installation of the application program may include displaying a first UI screen including a map image representing a device arrangement under an environment where the network is constructed, and an application information field, and if the device is selected from the map image and the application program is selected from the application information field, transmitting and installing the selected application program to the selected device. The carrying out the driver installation of the driver program may include displaying a second UI screen including map image, and if a device is selected from the map image included in the second UI, installing the driver program corresponding to the selected device onto the user terminal device.

The map image represents a device image indicated at a location in which the corresponding device is placed under the network environment, and a menu to indicate information about the device is displayed on one side of the device image next to the device image.

The carrying out the application installation may include, if one of the devices on the map image and one of the application programs on the application information field are moved by drag-and-drop manner to another side, determining the corresponding device and the corresponding application program to be selected.

The carrying out the application installation may additionally include, if the selected application program is already installed in the selected device, generating and displaying a user interface (UI) window to inquire as to whether the application program is to be installed or not.

The carrying out the application installation may include if a device image is selected from the map image, inactivating a displaying status of an application program which is non-installable onto the selected device, from among the application programs indicated in the application information field, and if an application program is selected from the application information field, inactivating a displaying status of a device which is incapable of installing the selected application program, from among the devices indicated on the map image.

The carrying out the application installation may additionally include detecting previously stored program compatibility information, and determining compatibility between each device and application program using the program compatibility information.

The method may include displaying on the second UI screen an information collect field to collect information about a device selected through the map image. The carrying out the driver installation may include if the information collect field is selected, displaying a list of device information collected in the selected information collect field, and if at least one piece of device information is selected from the list, receiving at least one driver program corresponding to the selected at least one device information from an external server.

The information about the device on the map image is collected into the information collect field by a drag-and-drop manner.

The main UI screen may further include a map image construct menu to construct the map image.

The foregoing and/or other aspects and utilities of one or more embodiments may be achieved by providing a user terminal device connected in a network, which may include a display to display a UI screen including a map image indicating therein a device arrangement under an environment in which the network is constructed, and an application information field, an input unit to receive a selection of a device from the map image, and a selection of an application program from the application information field, and a controller to control installation of the application program selected from the application information field onto the device selected from the map image.

The user terminal device may additionally include a storage unit, and a network interface connected in the network. The controller either reads out the selected application program from the storage unit, or receives the selected application program from an external server via the network interface and transmits the received selected application program to the selected device.

The map image may include a device image which is indicated at a location where each corresponding device is installed under the network environment, a menu provided at one side of the device image to indicate information about the corresponding device, and a menu provided at one side of each application program indicated on the application information field, to indicate detailed information about the corresponding application information.

If a device image is selected from the map image, the controller inactivates displaying status of a non-installable application program among the application programs indicated in the application information field, and if an application program is selected from the application information field, the controller inactivates displaying status of a non-installable device among the devices indicated on the map image, in which the non-installable application program is an application program which is not installable onto the selected device, and the non-installable device is a device onto which the selected application program can not be installed.

If the application program is already installed on the selected device, the controller displays a message window through the display to inquire as to whether or not to proceed with installation.

The foregoing and/or other aspects and utilities of one or more embodiments may be achieved by providing a user terminal device which may include a storage unit, a network interface connected in a network, a display to display a UI screen including a map image indicating therein an arrangement of devices under an environment where the network is constructed, and a user interface (UI) screen including therein an information collect field, an input unit to receive a selection for at least one device on the map image, and a controller to control so that, if at least one device is selected from the map image, the information about the at least one selected device is included in the information collect field, and if a command to install at least one driver is input through the input unit, a at least one driver program corresponding to the information included in the information collect field is installed to the storage unit.

The controller controls so that, if the information collect field is selected from the UI screen, a list of the device information collected in the information collect field is displayed through the display, and if at least one piece of device information is selected from the list, at least one driver program corresponding to the selected device information is received from an external server.

The foregoing and/or other aspects and utilities of one or more embodiments may be achieved by providing a recording medium storing therein a program to execute a method for managing a device connected in a network, which may include displaying a main user interface (UI) screen indicating therein a first install menu to install an application program and a second install menu to install a driver program, if the first install menu is selected, displaying a first UI screen indicating therein a map image representing an arrangement of devices under an environment where the network is constructed, and an application information field, if a device is selected from the map image of the first UI screen and an application program is selected from the application information field of the first UI screen, transmitting and installing the selected application program onto the selected device, if the second install menu is selected, displaying a second UI screen including therein map image which indicates therein arrangement of devices under environment where the network is constructed, and if a device is selected from a map image of the second UI screen, installing a driver program corresponding to the selected device onto a user terminal device.

As a result, a user can install an application program to a device and install a driver program to a user terminal device conveniently and efficiently.

According to another aspect, there is provided at least one computer readable medium storing computer readable instructions to implement methods of embodiments.

BRIEF DESCRIPTION OF THE DRAWINGS

These and/or other aspects and utilities of embodiments will become apparent and more readily appreciated from the following description of embodiments, taken in conjunction with the accompanying drawings of which:

FIGS. 3 to 12 are conceptual views illustrating a screen on a user terminal device according to various exemplary embodiments;

DETAILED DESCRIPTION

Figure 1:
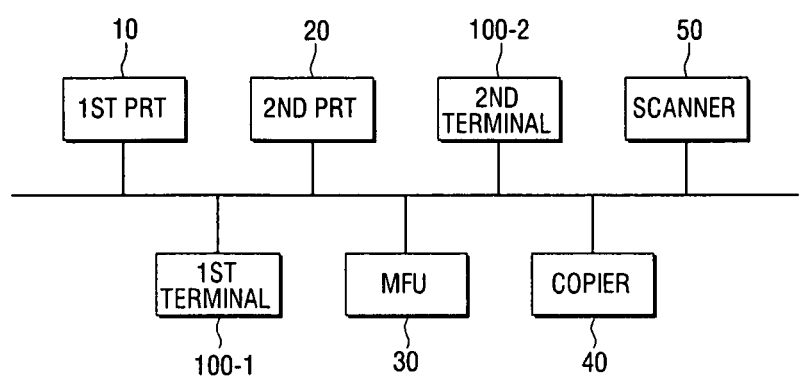
FIG. 1 is a conceptual view of a network system structure according to an exemplary embodiment.

Reference will now be made in detail to embodiments, examples of which are illustrated in the accompanying drawings, wherein like reference numerals refer to the like elements throughout. Embodiments are described below in order to explain the disclosure by referring to the figures.

FIG. 1 is a view illustrating a structure of a network system according to an exemplary embodiment.

Referring to FIG. 1, an exemplary embodiment of a network system includes a plurality of terminal devices 100-1, 100-2, and a plurality of devices 10, 20, 30, 40, 50.

Although FIG. 1 depicts two terminal devices 100-1, 100-2 and five devices 10, 20, 30, 40, 50 as an example, the number of the terminal devices or devices may change depending on an environment where the network system is provided, and type of devices may also change. For example, the terminal devices 100-1, 100-2 may include various types of devices such as PC, laptop computer, PDA, electronic dictionary, or mobile phone, and the devices 10, 20, 30, 40, 50 may include not only printers 10, 20, MFU 30, copier 40, or scanner 50, but also various other networkable devices including, for example, a display device such as a TV or an electronic frame, an image replay device such as a DVD player or a Blue-ray Disc (BLD) player, or the like.

User of each terminal device 100-1, 100-2 may check the status of each device 10, 20, 30, 40, 50 connected in the network and manage the devices 10, 20, 30, 40, 50 using his terminal device 100-1 or 100-2.

Specifically, as the user of the terminal device 100-1 or 100-2 executes a management program installed on his terminal device 100-1 or 100-2, the terminal device 100-1 or 100-2 displays a user interface (UI) screen regarding device management on a display thereof.

The user may select corresponding menus on the UI screen to check the status of the devices 10, 20, 30, 40, 50 or carry out a particular management process.

Meanwhile, if the screen changes according to the users' selecting of a menu from the UI initial screen or UI screen, the new screen appears, indicating a map image thereon. The 'map image' herein refers to information represented in a map format, indicating a layout of a network environment, such as layout of an office, company, or home network environment having the network system of FIG. 1 constructed therein. The map image may indicate the way the network devices are arranged in the layout. By way of example, the map image may indicate locations of the devices using corresponding images or texts.

The user may select a target device he intends to install a desired program onto the target device, or install a driver program corresponding to the target device onto his own terminal device, directly onto the map image.

Figure 2:
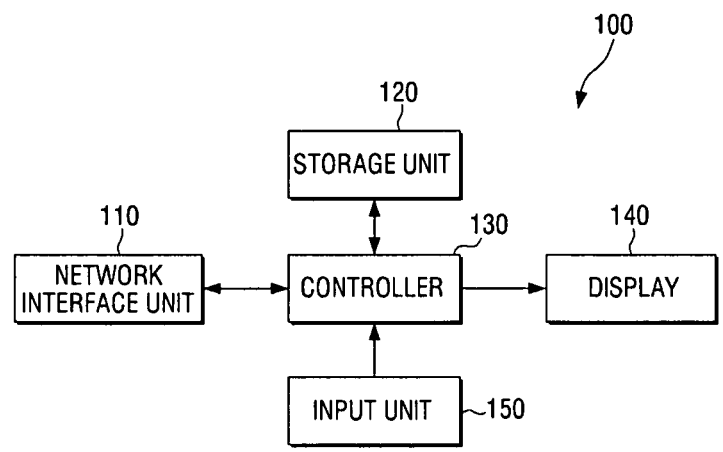
FIG. 2 is a block diagram of a user terminal device according to an exemplary embodiment.

FIG. 2 is a block diagram of a terminal device according to an exemplary embodiment. The structure illustrated in FIG. 2 is applicable to a first terminal device 100-1 or a second terminal device 100-2 of the network system of FIG. 1.

Referring to FIG. 2, the user terminal device 100 includes a network interface 110, a storage unit 120, a controller 130, a display 140, and an input unit 150.

Network interface 110 is a unit capable of relaying communication between the user terminal 100 and the other devices either connected in the network or outside the network. Accordingly, the network interface 110 supports transmission and reception of data or command between the controller 130 of the user terminal 100 and the devices other than the user terminal 100.

The storage unit 120 may include various types of storages such as non-volatile memory, volatile memory, or buffer. The storage unit 120 may store various data such as, for example, O/S or other application programs to drive the user terminal device 100, data generated during execution of the application programs, document information written through the user terminal device 100, setting information, or the like. Although FIG. 2 illustrates only one storage unit 120, there may be one or more storage unit 120 depending on occasion.

The controller 130 controls the functions of the respective components of the user terminal device 100.

The display 140 displays various UI screens according to the control of the controller 130. Although not illustrated in FIG. 2, the display 140 may include various other components such as a screen processing unit (not illustrated) to construct a UI screen, a display panel to display the constructed UI screen, or the like.

The input unit 150 receives a command input by a user, and transfers the input command to the controller 130. The input unit 150 may include keyboard, mouse, joystick, touch screen, or the like.

The user terminal device illustrated in FIGS. 1 and 2 may operate in various modes according to various examples of embodiments, and these will be explained in greater detail below, with reference to FIGS. 3 to 12.

Embodiment 1

According to a first exemplary embodiment, the display 140 of the user terminal device 100 displays a UI screen which includes therein a map image and an application information field. The user may select a target device to which he intends to install an application program from the map image, and may also select an application program he intends to install from the application information field.

The application information field may display a list form of various application programs which can be installed onto a device. The application information on the application information field is not limited to the information regarding the application programs stored in the user terminal device 100. For example, the application information field may also display application information notified from an external server.

The external server may transmit an application program to user terminal devices connected in a network, if the external server has a new application program usable by the users or if the existing application program is updated, providing the users with the application programs and the users can use these as need arises.

If selecting a device and an application program through the map image and application information field is completed, the controller 130 causes the selected application program to be transmitted to and installed onto the selected device. If the selected application program is already stored in the storage unit 120, the controller 130 may directly transmit the application program stored in the storage unit 120 to the selected device via the network interface 110.

If the selected application program is not stored in the storage unit 120, the controller 130 may send a request to the external server via the network interface 110 to transmit the selected application program. Accordingly, the controller 130 receives the requested application program from the external server and transmits the received application program to the selected device.

The controller 130 may control so that an installation command is also transmitted to the selected device along with the application program, so that the device can automatically install the received application program thereon.

Meanwhile, the controller 130 may cause information about the application program, network address of the selected device, and transmission request for application to be also transmitted to the external server, so that the external server transmits the application program directly to the selected device.

Figure 3:
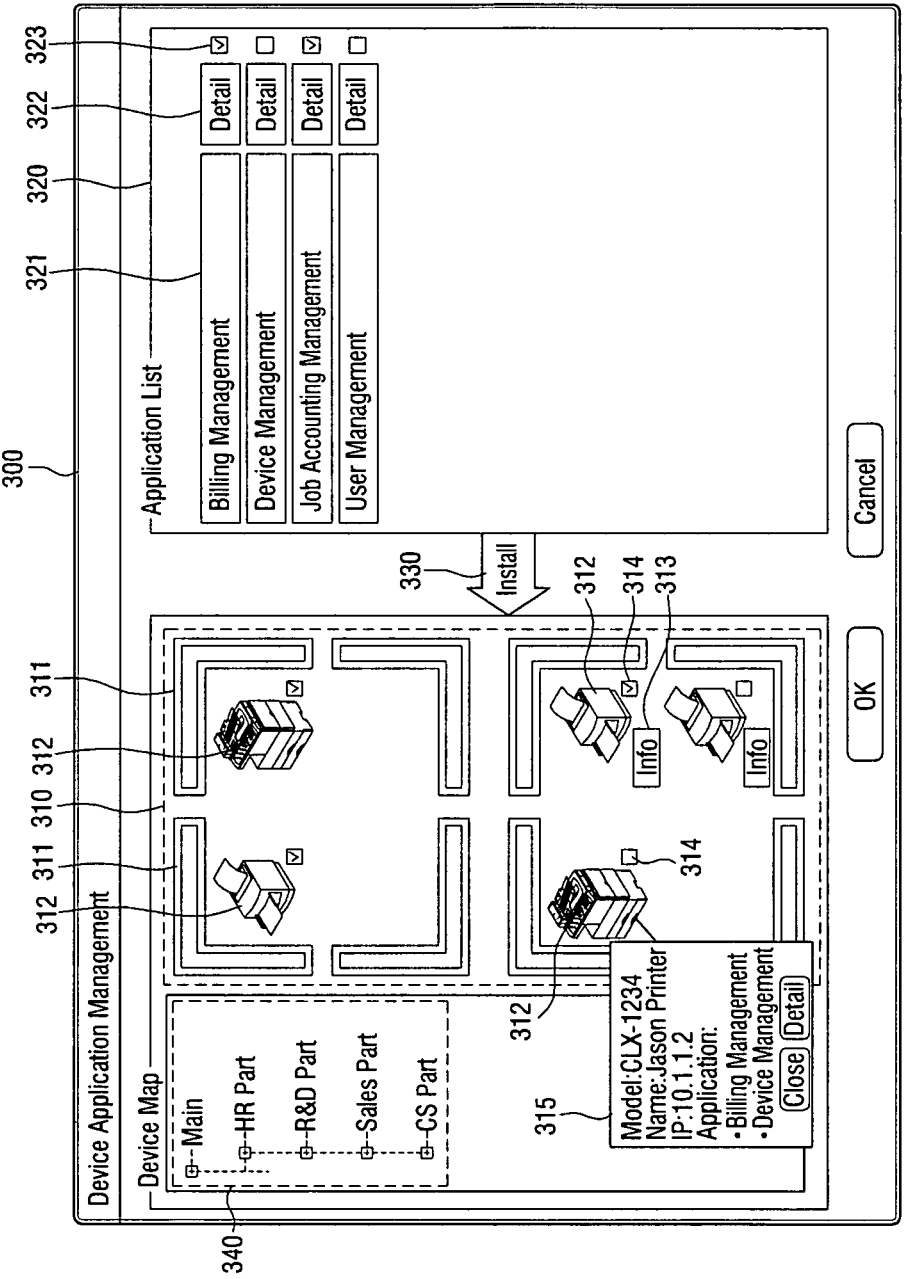

FIG. 3 illustrates an example of a UI screen of the user terminal device according to a first exemplary embodiment.

Referring to FIG. 3, the display 140 of the user terminal device 100 includes, on the UI screen 300, not only the map image field 310 and the application information field 320, but also a button 330 to command installation of the application, or a map image select field 340 to select the map image.

If it is impossible to represent the environment of the user on one single map image, the user may select the map image of the specific location that he wants to see, from the map image select field 340. That is, referring to FIG. 3, the map image select field 340 may include menus corresponding to various parts of a company such as 'HR part', 'R&D part', 'Sales part', 'CS part', or the like, and in response to a user's selecting on one of the menus, display a map image of the part corresponding to the selected menu on the map image field 310. A map image of a part, sector, or floor where the user terminal device 100 is located, may be displayed in an initial stage by default.

The map image field 310 of the UI screen 300 displays a layout 311 of the network environment, and device images 312 are overlapped at the corresponding locations on the layout 311. As illustrated in FIG. 3, the images on the UI screen 300 may correspond to the devices represented by the images, but this is not limiting. Accordingly, the devices may be presented by various ways, such as marks, symbols, or text lain at the locations of the devices.

Additionally, a menu 313 to check the information about a corresponding device, and a select field 314 to select the corresponding device, may be displayed on a side of each image 312. Accordingly, if the menu 313 is selected, a field 315 indicative of various information about the corresponding device is open on the UI screen 300. By way of example, the field 315 may indicate model number, product name, IP, or information about pre-stored application programs.

Although the field 315 indicative of the information about the corresponding device is depicted as being open at a side of the device image in FIG. 3, one will understand that this field 315 may be open at other empty space on the UI screen 300. For example, the field 315 may be open at an empty space underneath the application information field 320, or even generated as a separate UI screen.

The application information installed in the corresponding device may be received from the device and stored, when the device is initially connected to the network and registered. The application information may also be updated referring to the history information of the device, when there is an application installed in the device.

The field 315 may also indicate a detail menu to check detailed information about the device, and a close menu to close the field 315. Accordingly, having checked on the information on the field 315, the user may select the close menu to cause the field 315 to disappear. Of course, the field 315 may be controlled to disappear automatically if a predetermined time elapses since the time when the field 315 is open.

The user may select the select field 314 provided at a side of the device image 312 to select a device to which he intends to install an application. As the user selects a device, the corresponding select field 314 may indicate a tick sign. Using the select field 314, the user may select one or more devices from one single UI screen 300.

Meanwhile, the user may select the application program to be installed, from the application information field 320. The application information field 320 may include an application information indicating field 321 to indicate application information, a menu 322 to display detailed information about the corresponding application program, and a select field 323 to select the corresponding application program.

Referring to FIG. 3, the application program may include, by way of example, 'billing management', 'device management', 'job accounting management', or 'user management.' Of course, the application program may additionally include different other programs to support new functions, by combining the functions supported by the device.

Figure 4:
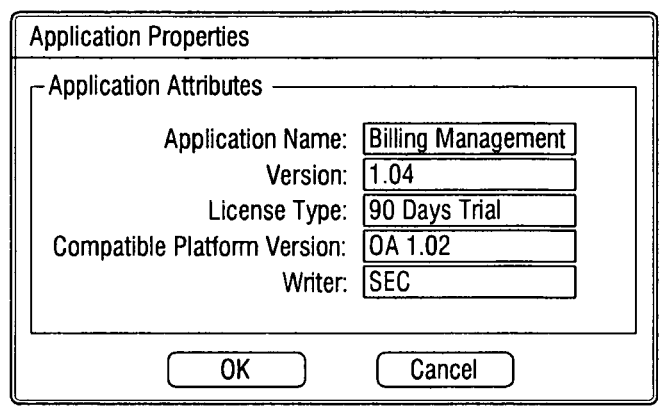

The user may determine whether or not to install the application program onto the target device, after checking the detailed information about the application program using the select field 323. FIG. 4 illustrates an example of the UI screen which is presented in response to the selecting on the select field 323. Referring to FIG. 4, the detailed information about the application program may include an application name, version, license information, compatible platform version, writer, or the like.

If selecting of a device and an application program is completed, the user may command the installation of an application program by selecting a button 330. Although FIG. 3 depicts the button 330 in the form of an arrow located between the map image field 310 and the application information field 320, the location and form of the button 330 are changeable.

According to an aspect of one or more exemplary embodiments, the device and application program may be selected by a drag-and-drop manner.

Figure 5:
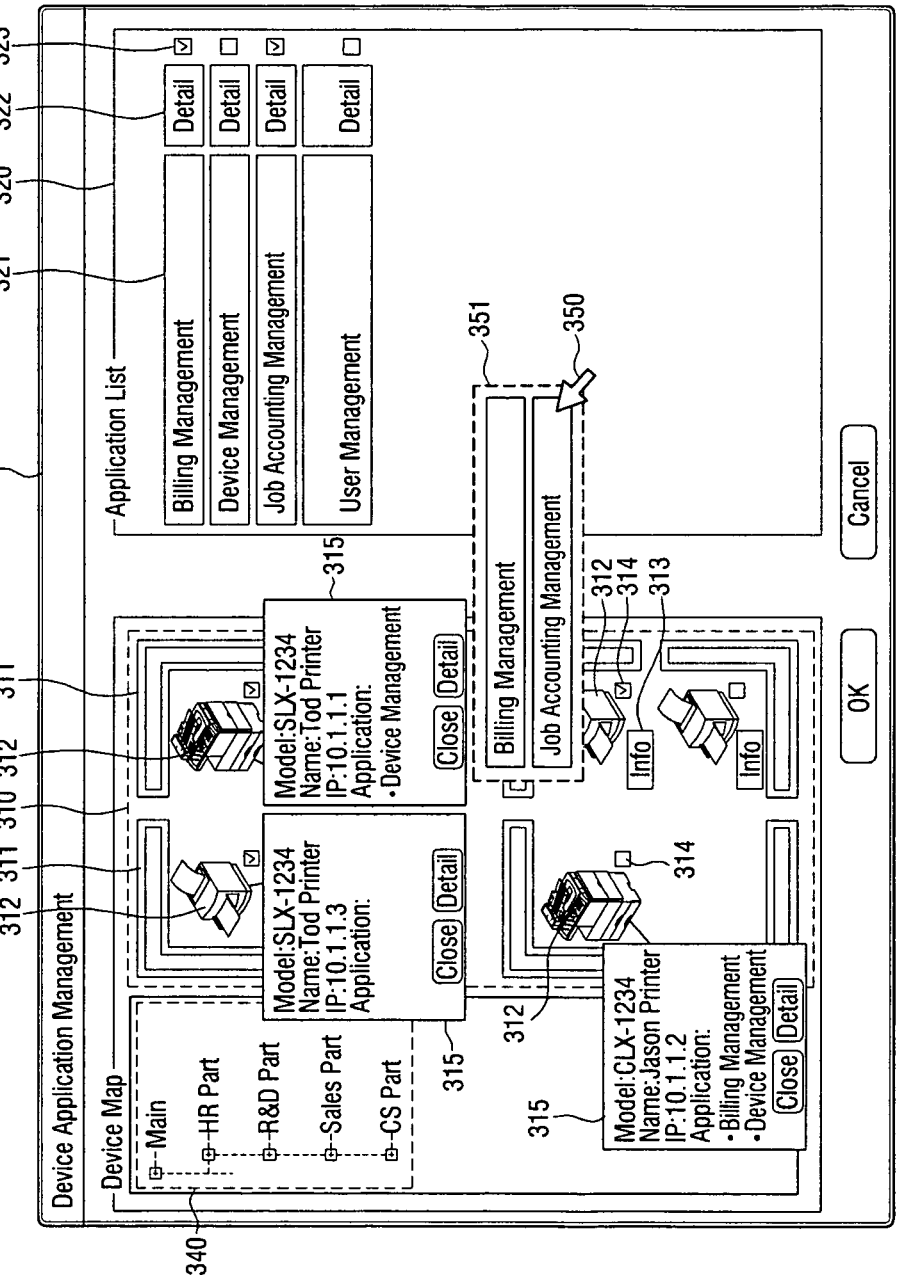

FIG. 5 illustrates a UI screen on which a device and an application program are selected by a drag-and-drop manner, according to a first exemplary embodiment.

Referring to FIG. 5, the UI screen 300 includes a cursor 350. The user may move the cursor 350 using the input unit 150.

Accordingly, using the cursor 350, the user may select one or more application programs from the select field 323 on the application information field 320, and then drag and drop the selected application programs to the device image on the map image 310. Alternatively, the user may drag and drop the device image on the map image 310 to the application information field 320.

Accordingly, the user is able to select one or more application programs and the device, and make an installation command at the same time. It is also possible to make an installation command to a plurality of devices by one single drag-and-drop, by selecting a plurality of device images 312 on the map image 310.

Referring to FIG. 5, the user clearly knows the application program he is selecting, since the dragged application program information 351 is displayed on one side of the dragging cursor 350.

The other repetitious explanation about overlapping components or operation will be omitted for the sake of brevity.

Figure 6:
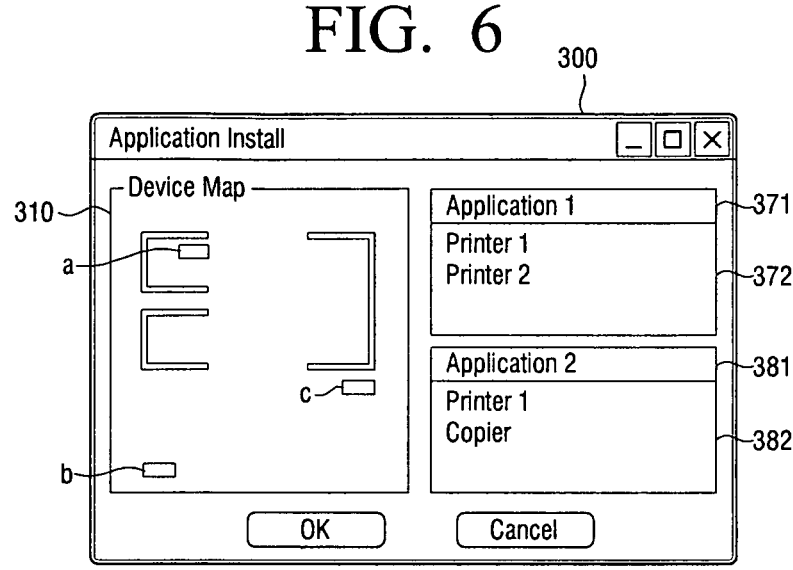

FIG. 6 illustrates a UI screen according to another aspect of an exemplary embodiment.

Referring to FIG. 6, the map image 310 may indicate only the images a, b, c of the devices on the layout. That is, different from the examples of FIGS. 3 and 5, on the UI screen of FIG. 6, the menu 313 to indicate information about the devices, and the select field 314 are omitted.

In response to the user's placing of a cursor on the image of the device, information regarding the corresponding device may be displayed on one side of the screen. The user may check the information displayed regarding the corresponding device, and move the device image to the application information fields 371, 381 by drag-and-drop manner using the cursor.

The number of application information fields 371, 381 corresponds to the number of application programs. Each of the application information fields 371, 381 may include fields 372, 382 to display information about the device which is dragged and dropped by the user. Accordingly, if the user drags and drops each device to the application information field 371, 381 to be installed, the information about the device is displayed on the device information field 372, 382 of the corresponding application information field.

The user may command to begin installation upon completing his selecting about each device, by selecting an OK button.

Meanwhile, a device may already have an application program installed thereon, when the user inputs an installation command regarding the particular application program. This example includes a case when the device has an old version of the application program.

In the above case, the controller 130 may display a message through the display 140, inquiring the user as to whether he wishes to proceed to overwriting the old existing application program.

The installation of the application program may begin immediately without displaying the above-mentioned inquiry message, if the device does not have the same application program installed thereon.

FIG. 7 illustrates an example of an inquiry message regarding installation of an application program.

Referring to FIG. 7, in a state that the device and application program are selected and an installation command is input, the attributes of the application program, attributes of the device, and attributes of the application program previously stored in the device, are displayed, along with an inquiry message which asks the user whether he wishes to proceed to installing the selected application program onto the device. The user may select 'Yes' to overwrite the corresponding application, 'Yes for all' to overwrite not only the corresponding application but also the other selected application programs, or 'No' to cancel installation process.

According to an aspect of an exemplary embodiment, if the device is selected in advance of the application program from the UI screen of FIG. 3, FIG. 5, or FIG. 6, or vice versa, the remaining select field may activate displaying of only the unselected application program (or device) which is compatible to the selected device (or application program) and inactivate displaying of the incompatible application program (or device).

For example, if a device is selected from the UI screen of FIG. 3, the application information field 320 may inactivate the displaying of the application programs which is incompatible to, or impossible to be installed onto the selected device.

Specifically, the select field 323 may be turned to a non-selectable state, and the application information field 321 of the corresponding application may be displayed in a non-transparent form. Alternatively, the application information of the corresponding application may be deleted from the application information field 320 temporarily.

If the user selects the application program in advance of the device, the controller 130 may inactivate the displaying of the device which is either incompatible to the selected application program or incapable of installing the selected application program. Specifically, the controller 130 may change the image of the corresponding device in a non-transparent form on the map image 310, or turn the select field 314 to a non-selectable state. Alternatively, the image of the corresponding device may be deleted from the map image 310 temporarily.

If the select state of the device or application program changes, the inactivated displaying may be returned to the activated state.

The controller 130 determines compatibility between a device and an application program, using the program compatibility information previously stored in the storage unit 120.

Figure 8:
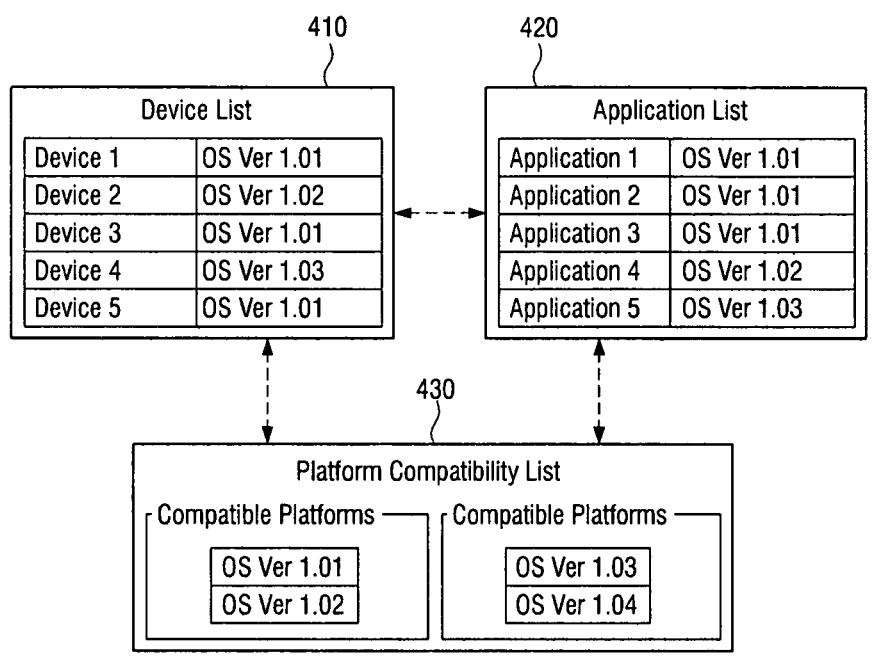

FIG. 8 illustrates an example of the program compatibility information stored in the storage unit 120.

Referring to FIG. 8, the storage unit 120 may store the program compatibility information, and the program compatibility information may include, for example, a device list 410 containing information about OS version installed in each device, an application list 420 containing information about OS version on which the application program is operable, or a list 430 containing information about a compatible platform.

The controller 130 may determine whether the application program is installable onto the device or not, using the program compatibility information stored in the storage unit 120. Referring to FIG. 8, OS version 1.01 is compatible to OS version 1.02, and OS version 1.03 is compatible to OS version 1.04. Also, version 1.01 is incompatible to version 1.03, or 1.04, and version 1.02 is also incompatible to version 1.03 or 1.04. Accordingly, if device 1 is selected from the device list 410, since device 1 has OS 1.01 installed thereon, the controller 130 determines that applications 1 to 4 from the application list 420 are installable onto device 1, while application 5 is non-installable. Accordingly, the controller 130 inactivates the displaying of application 5.

As explained above, activating or inactivating the displaying may be carried out on the UI screen as the ones illustrated in FIGS. 3, 5, and 6. Alternatively, the device list 410 and the application list 420 of FIG. 8 may be displayed directly through the display 140, so that the displaying of the corresponding device or application is activated or inactivated on the displayed list.

According to a first exemplary embodiment, the user is enabled to check the locations of the devices and determine a device to install an application program accurately, by using a UI screen which provides both the map image and the application information field.

Furthermore, since the user can check even information about the devices, the user can easily select the application program to install onto the device. Furthermore, since it is possible to install a plurality of application programs onto a plurality of devices concurrently, it becomes easier to install and manage programs.

Embodiment 2

According to a second exemplary embodiment, the user terminal device 100 provides a UI screen indicating a map image thereon. Accordingly, as a user selects one or more devices on the map image, driver program(s) corresponding to the selected device(s) is(are) installed onto the user terminal device 100. As a result, the user can easily find a device he intends to use, and directly install a driver program corresponding to the found device onto his own user terminal device 100.

Figure 9:
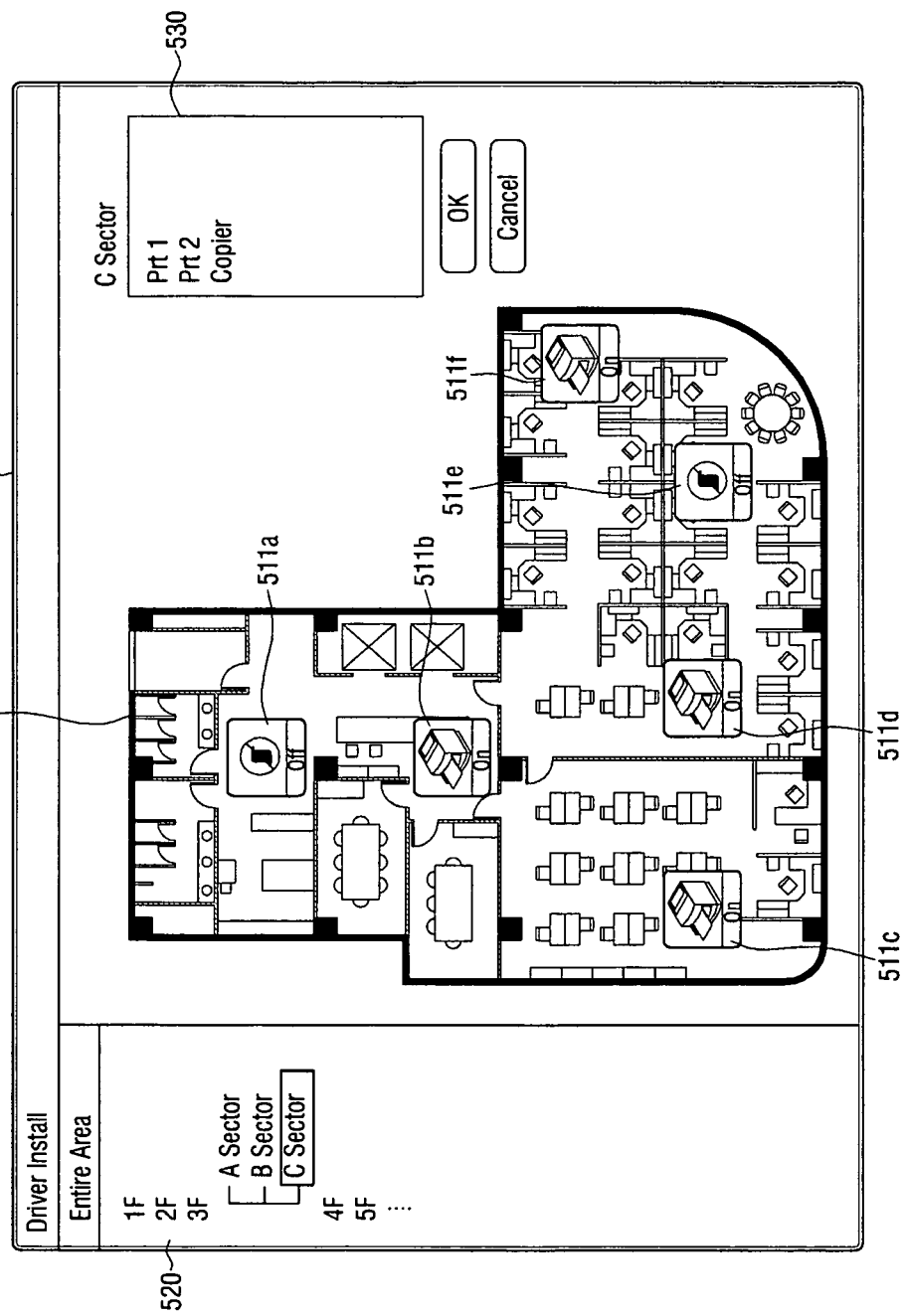

FIG. 9 illustrates an example of a UI screen of the user terminal device according to a second exemplary embodiment. For convenience of explanation, the structure of the user terminal device will be explained with reference to the block diagram of FIG. 2.

According to a second exemplary embodiment, the controller 130 of the user terminal device 100 generates a UI screen 500 including therein a map image 510, and displays the generated UI screen 500 on the display 140. The UI screen 500 may also include a map image select field 520 to select a map image of a specific environment from the entire environment to which the user belongs to.

Unlike the examples shown in FIGS. 3 and 5, the map image in FIG. 9 includes the map image select field 520 which is divided into floor units, and each floor is subdivided into sectors. FIG. 9 particularly illustrates an example of a map image regarding the C sector on the third floor. Although the map image 510 and the map image select field 520 of FIG. 9 are illustrated in different forms from those of FIGS. 3, 5, and 6 for the purpose of convenient explanation, one will understand that the same map images of FIGS. 3, 5, and 6 are also applicable.

Referring to FIG. 9, the devices 511a, 511b, 511c, 511d, 511e, 511f are indicated at corresponding locations on the map image 510.

The user may select the images of the devices 511a, 511b, 511c, 511d, 511e, 511f on the map image 510 using the input unit 150.

The device information of the selected device image may be displayed on the information collecting field 530. Accordingly, the user can check the information about the device he selects, through the information collecting field 530. Although only the names of the devices appear on the information collecting field 530 in FIG. 9, other types of information such as device type, function, or manufacturer may also be displayed.

If the user completes selecting a device and selects an OK button, the controller 130 receives a driver program corresponding to the selected device from the eternal server corresponding to the device information included in the information collecting field 530. By way of example, the controller 130 may send a corresponding server a request including device information, information about user terminal device, or the like, and receive the driver program as a response.

In the above situation, the external server may request a user authentication. In this case, the controller 130 may display a user authentication window on the display 140, asking a user to input information necessary for user authentication such as a user ID and a password. If the user completes inputting required information through the input unit 150, the user information is transmitted to the external server for authentication. If authentication is completed successfully, the driver program is downloaded from the external server and stored in the storage unit 120.

Figure 10:
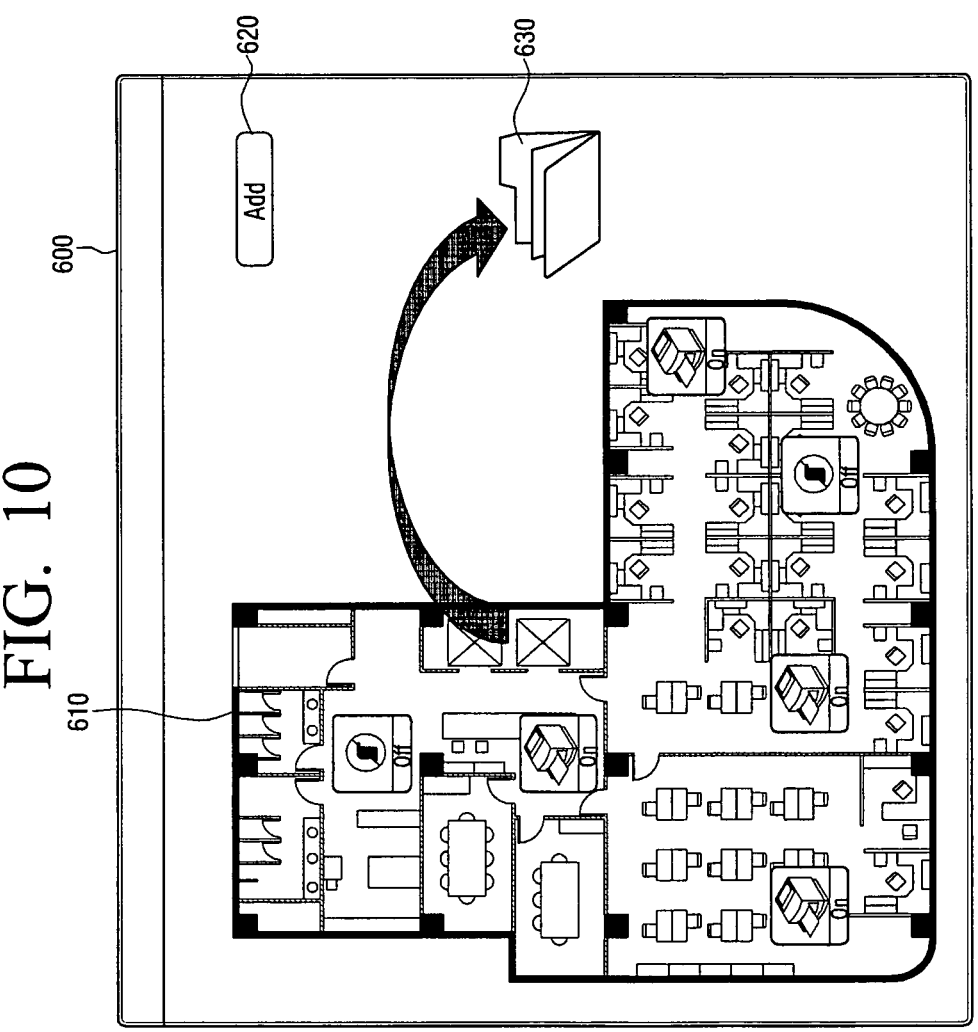

FIG. 10 illustrates an example of a UI screen according to another example of the second embodiment.

Referring to FIG. 10, the UI screen 600 may display the map image 610, along with the information collecting field 630 which is provided in a folder form. The user may move the device image to the information collecting field 630 on the map image 610 by drag-and-drop, or add the device image to the information collecting field 630 by selecting the device and selecting an 'Add' button 620.

When the user completes selecting all things related to the target device, the user selects the information collecting field 630 and checks the information regarding the device information collected.

FIG. 11 illustrates an example of a list which is displayed when the information collecting field 630 is selected.

Referring to FIG. 11, the list may include information such as a name of the device selected from the map image, a device type, an IP address, a current status, a location, or an order of installation, or the like. However, since the list in FIG. 11 is only one of many possible examples, deletion or addition of certain information from or to the list is possible. The user checks the current status of the list and determines whether the device has an error or in a power-on state, etc.

While checking the list 700, the user may finalize his selection of the driver program, using a select field 710, an installation start menu 720, and a remove menu 730. For example, if the user determines that it is impossible to use a specific device on the list considering problems such as toner-out or malfunction, the user selects the corresponding device information using the select field 710, and cancels the installation of the driver regarding the corresponding device information by selecting the remove menu 730. If selection of a device to use is finalized, the user selects corresponding device information, and selects the installation start menu 720 according to which the driver program corresponding to the all the selected device information is downloaded from the external server and installed onto the device.

Meanwhile, the devices added to the list 700 are basically assigned with an installation order according to a sequence in which the devices are added. However, the order of installation is changeable. For example, as illustrated in FIG. 11, an arrow-form button may be provided next to the figures indicating the installation order of each device. The user may change the order of installing the driver programs by manipulating the button. Accordingly, if need arises, for example, if a user needs to use a specific device faster than the other devices preceding in order, the user may rearrange the order of installing the driver program so that the driver program is installed onto the specific device first, and save time.

The 'external server' may be a web server, or a managed printing and service or solution (MPS) server separately provided to manage the respective devices of the network. In the latter's case, the user terminal device 100 may include a client program so as to access and use the MPS system.

The MPS server may include a database, that is, a collection of shared data, which stores and operates the integrated information of many application systems. Accordingly, it is possible to store in the database the information including, for example, unique information of each device (such as IP address, driver, location information, etc.), status information (such as error occurrence, On/Off status, etc.), or operation log (such as output amount, rate of operation, etc.), and provide the database for reference in response to a request received from the user terminal device 100. The MPS server may also update the information of the database if a device has changes in its state, or the like.

The map image illustrated in FIGS. 9 and 10 may be stored in the storage unit 120, or alternatively, provided from the MPS server and displayed. That is, the controller 130 of the user terminal device 100 may receive from the MPS server the information required for creating the UI screen and display the received information on the screen, according to a user selection command input through the input unit 150.

Meanwhile, the MPS server or the controller 130 drives installation program such as ActiveX or Java Applets to install a corresponding driver program onto the storage unit 120 of the user terminal device, if a button to start installation is selected on the UI screen as the one illustrated in FIG. 9, or if the installation start menu 720 is selected on the list as the one illustrated in FIG. 11. As a result, the corresponding driver program is installed onto the user terminal device 100 automatically, that is, without requiring further intervention of the user.

A window may be displayed on the screen to indicate the extent of processing of the driver installation, so that the user can easily check how the installation is proceeding during the installation.

Embodiment 3

Figure 12:
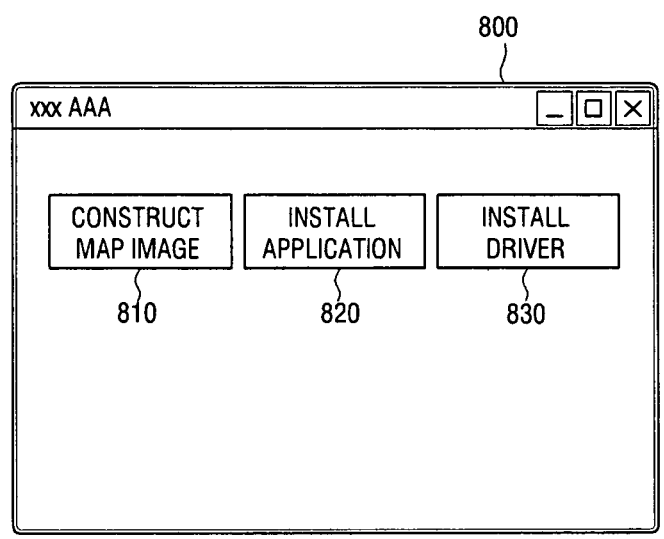

FIG. 12 illustrates an example of a UI screen displayed on a user terminal device according to a third exemplary embodiment.

Referring to FIG. 12, the UI screen 800 may include a map image construct menu 810, an application install menu 820, and a driver install menu 830.

The map image construct menu 810 is used to construct a map image of an environment where the user is located. Accordingly, the user selects the map image construct menu 810, and inputs an original map image using a scan image of a photo of the user's environment, a graphic image layout, or blueprint. The user then writes device images or text information including model names, or product numbers of the devices on the original map image, according to the exact locations of each device in the user's environment.

The image or text input may be made through the input unit 150 of FIG. 2, and the final form of the map image may be stored in the storage unit 120 of the user terminal device 100 or in the external server. The device image may be selected from the previously created icons and arranged on an appropriate location on the map image by drag-and-drop, or alternatively, the user may create a new graphic image to represent the device image and arrange the created image on the map image. Alternatively, the user may write in text information and arrange the text at an appropriate location. The map image, once stored in the manner described above, may be used repeatedly in the later process.

Meanwhile, if a new device is added to the network, if device is moved to a different location, or if existing device is not used anymore, the user may select the map image construct menu 301 to update the old map image.

The application install menu 820 is used to install an application program onto a device of a network.

Accordingly, if the application install menu 820 is selected, the controller 130 changes the main UI screen 800 to display a UI screen which includes the map image and application information field as illustrated in FIGS. 3, 5 and 6. For convenience of explanation, the UI screen for use in installation of the application is referred to as a 'first UI screen' hereinbelow. Accordingly, the user selects a device on the map image, selects an application program on the application information field, and carries out application installation process. Since the way of installing the application is explained above in the first embodiment, this will not be discussed in detail for the sake of brevity.

The driver install menu 830 is used to install a printer driver program onto the user terminal device.

If the driver install menu 830 is selected, referring to FIGS. 9 and 10, the controller 130 changes the current screen to display a UI screen which includes the map image. The UI screen used to install a driver will be referred to as a 'second UI screen' hereinbelow for convenience of explanation.

The user may select a device on the map image, and if the device is selected, the corresponding driver program is installed onto the user terminal device 100 automatically. Since the way of installing a driver has been explained above in the second embodiment, this will not be discussed in detail below for the sake of brevity.

As explained above, application or driver installation may be provided as one total solution to manage the network devices.

Figure 13:
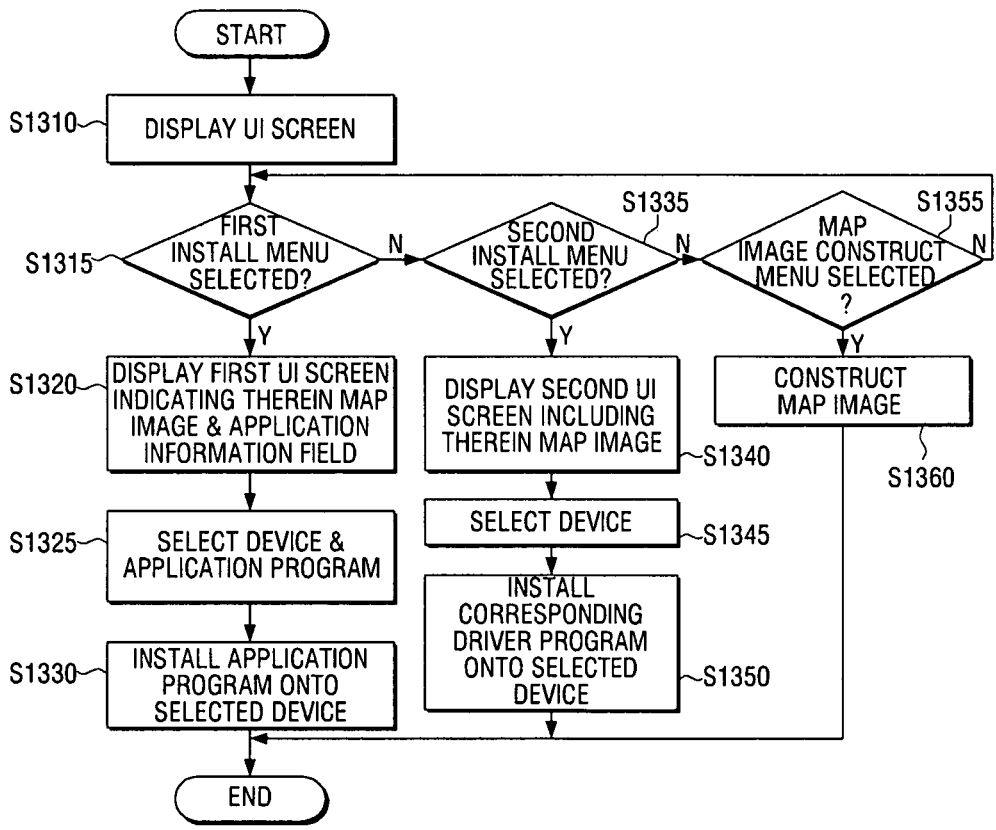
FIG. 13 is a flowchart provided to explain a method of managing a network device according to an exemplary embodiment.

FIG. 13 is a flowchart provided to explain a method for managing a network device according to a third exemplary embodiment.

Referring to FIG. 13, if the user executes a program provided to manage the network device, at S1310, a UI screen appears. This UI screen will be referred to as a 'main UI screen' hereinbelow for the sake of convenient explanation. Referring to FIG. 12, the main UI screen may include the map image construct menu 810, the application install menu 820, and the driver install menu 830. Depending on the particular examples applied, the map image construct menu 810 may be omitted.

The user may select a specific menu on the main UI screen.

At S1315, if the user selects the application install menu ('first install menu'), at S1320, the first UI screen including a map image and an application information field therein, is displayed. The first UI screen may have the identical forms as those illustrated in FIGS. 3, 5, and 6, but it not limited thereto.

At S1325, the user selects a device on the map image of the first UI screen, and selects an application program on the application information field.

If selection is completed, at S1330, the user terminal device 100 starts installing the selected application program onto the selected device.

At S1335, if the selected menu is not the first install menu, but the driver install menu ('second install menu'), at S1340, the second UI screen including a map image therein, is displayed. The second UI screen may have the same form as the one illustrated in FIG. 9 or FIG. 11, but is not strictly limited thereto. The map image on the second UI screen may use the same images as those on the map image on the first UI screen, but this is not strictly limiting. Accordingly, the map image may have different structures as these may be customized suitably to the installation characteristics of the driver.

At S1345, the user may select a device from the map image on the second UI screen.

At S1350, if the device is selected, a driver program corresponding to the selected device is installed onto the user terminal device.

At S1355, if the selected menu is not the first or second install menu, but the map image construct menu, at S1360, the user or network manager may generate a layout of the map image on the UI screen provided for the construction of the map image, and then arrange device images or texts appropriately, according to the locations on the layout which correspond to the respective devices. As a result, a map image to be used for the UI screen of the first and second install menus is constructed and stored in advance.

Figure 14:
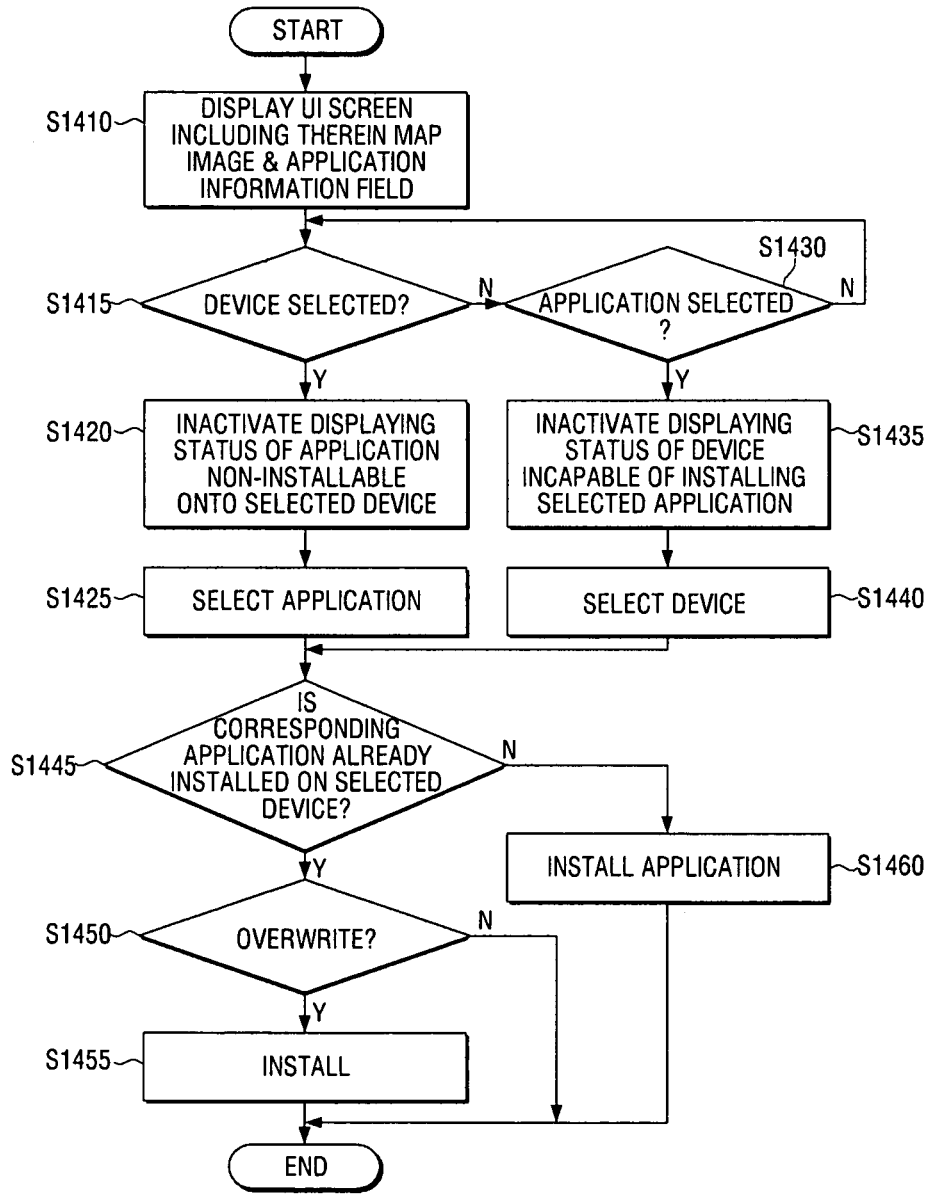
FIG. 14 is a flowchart provided to explain a method of installing an application according to an exemplary embodiment.

FIG. 14 is a flowchart provided to explain an example of a method for installing an application.

Referring to FIG. 14, at S 1410, a UI screen including therein a map image and an application information field is displayed. The user may select a device from the map image, and select an application program from the application information field.

At S1415, if a device is selected first, at S1420, displaying of an application, which is not installable onto the selected device, on the application information field is inactivated, and at S1425, an application program is selected in such a state.

At S1430, if a user selects an application program first, at S1435, displaying of a device which can not install the selected application program thereon, is inactivated, and at S1440, the user selects a device in such a state.

As the selection of the device and the application program is completed through the above-explained processes, at S1445, the user terminal device 100 determines whether or not the selected device already has the corresponding application program installed thereon. The user terminal device 100 determines the device has the corresponding application program, even when the existing application program is in a different version.

If it is determined that the selected device has the existing application program, at S1450, the user terminal device 100 inquires the user as to whether the user wishes to proceed overwriting the existing application program or not. At S1455, if the user selects to confirm the intention to overwrite, the corresponding application program is installed.

Meanwhile, if the selected device does not have the application program installed thereon, at S1460, the selected application program is directly installed onto the device.

By the processes described above, installation of an application program onto the device is completed.

Figure 15:
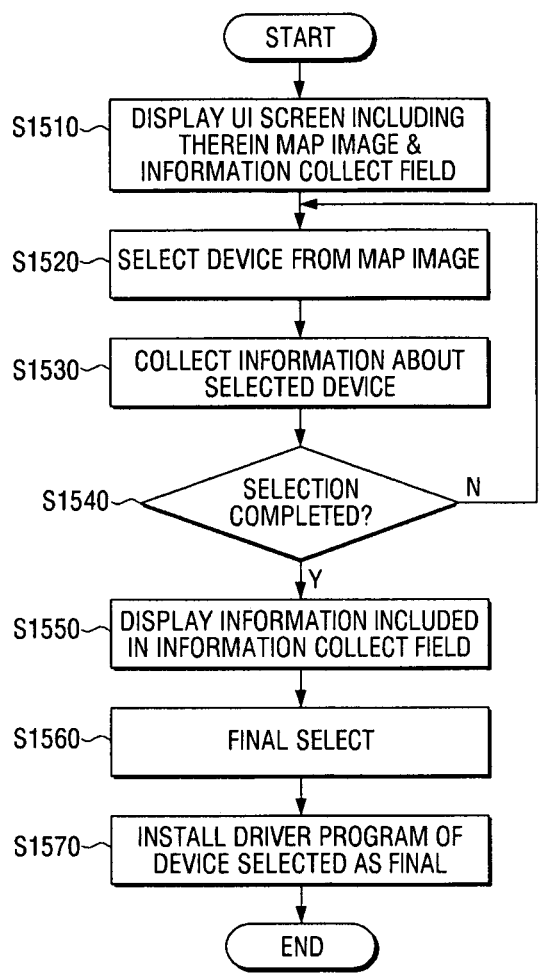
FIG. 15 is a flowchart provided to explain a method of installing a driver according to an exemplary embodiment.

FIG. 15 is a flowchart provided to explain an example of a method for installing a driver according to an exemplary embodiment.

Referring to FIG. 15, at S1510, a UI screen including therein a map image and an information collect field is displayed.

At S1520, the user selects a device he intends to use from the map image on the displayed UI screen. At S1530, information regarding the selected device is collected in the information collect field.

At S1540, if the user completes selecting a device, at S1550, the information of the information collect field is displayed according to a user command input by the user to check the device information collected in the information collect field. The device information may be displayed in a list form.

At S1560, the user re-selects a device he intends to use by checking the device information. Specifically, the user may finalize his determination as to the selected device by selecting installation start menu or remove menu on the list illustrated in FIG. 11.

At S1570, if the user finalizes his determination to select the device, the driver program corresponding to the selected device is installed onto the user terminal device.

By the above-explained processes, the driver program is installed onto the user terminal device.

One or more embodiments may be realized as a medium/media storing therein a program to execute various embodiments including those explained above. The program may be executed by executing computer readable code/instructions in/on a medium/media, e.g., a computer readable recording medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, a hard disc, a memory card, a USB memory, or any other computer-readable recording media etc.). The medium/media may also be computer-readable recording media in a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

Furthermore, in many examples explained above, the 'device' is not strictly limited to the image forming apparatus. Accordingly, the examples of exemplary embodiments may be applied to various other types of devices.

Furthermore, although the above-described examples focused on installing an application program or a driver program onto a selected device, other examples are also possible. For example, a user may select a device from a map image, so that certain data can be transmitted to or received from the selected device.

Meanwhile, although various examples of exemplary embodiments are applicable to the user terminal device such as the one illustrated in FIG. 2, this is not strictly limiting. Accordingly, certain components may be omitted from the user terminal device in FIG. 2, or new components may also be added.

Furthermore, various types of devices may be applied as the device of the network system in FIG. 1. For example, the device may be an image forming apparatus, and the image forming apparatus may include an interface to receive print data, a main controller to convert the print data into image data, and an engine unit to print the image data converted at the main controller onto a printing paper sheet.

The main controller may transmit various types of information such as a product name, a model number, manufacturer information, or an installed application, to a managing server, as the image forming apparatus is connected to the network. The user terminal device or managing server may construct a map image based on the received information, and create a UI screen so that the user can manage the network devices more efficiently.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. A user terminal device connected in a network, the user terminal device comprising:
   a display to display a main user interface (UI) screen including therein a first install menu to install an application program and a second install menu to install a driver program;
   an input unit through which one of the first install menu and the second install menu is selected on the main UI screen; and
   a controller to carry out an application installation in which the application program is installed onto a device connected in the network, if the first install menu is selected, or carry out a driver program installation in which the driver program is installed onto the user terminal device, if the second install menu is selected, wherein
   if one of the first install menu and the second install menu is selected, the controller causes the display to display an application information field and a map image, indicative of an arrangement of devices in an environment where the network is constructed, and carries out the application program installation or the driver program installation onto the device selected from the map image;
   if a device image is selected from the map image, the controller inactivates displaying status of a non-installable application program among the application programs indicated in the application information field, and
   if an application program is selected from the application information field, the controller inactivates displaying status of a non-installable device among the devices indicated on the map image, in which the non-installable application program is an application program which is not installable onto the selected device, and the non-installable device is a device onto which the selected application program cannot be installed.

2. The user terminal device of claim 1, wherein the controller controls the display to display a first UI screen including therein a map image field having the map image indicated therein, and the application information field, if the first install menu is selected, and
   if a device is selected from the map image and an application program is selected from the application information field through the input unit, transmits the selected application program to the selected device.

3. The user terminal device of claim 2, wherein the map image includes a device image which is indicated at a location where each corresponding device is installed under a network environment, and a menu provided at one side of the device image to indicate information about the corresponding device.

4. The user terminal device of claim 2, wherein, if one of the devices on the map image and one of the application programs on the application information field are dragged and dropped into a device image or an application program on the other field, the controller determines that the corresponding device and the corresponding application program are selected, and therefore, transmits an application program corresponding to the selected application information to the selected device.

5. The user terminal device of claim 2, wherein, if the selected application program is already installed in the selected device, the controller generates a UI window to inquire about an intention to proceed installation of an application program, and causes the display to display the generated UI window.

6. The user terminal device of claim 2, further comprising a storage unit to store program compatibility information therein, and wherein the controller determines a possibility of installing each application program onto each device, using the program compatibility information stored in the storage unit.

7. The user terminal device of claim 1, further comprising a storage unit, and wherein the controller controls the display to display a second UI screen including the map image therein, if the second install menu is selected, and
   if a device is selected from the map image on the second UI screen, installs a driver program corresponding to the selected device to the storage unit.

8. The user terminal device of claim 7, wherein the second UI screen displays an information collect field to collect information about a device selected through the map image, and
   if the information collect field is selected, the controller controls a list of the device information collected in the selected information collect field to be displayed, and if information about at least one device is selected from the list, the controller receives from an external server at least one driver program which corresponds to the selected information about at least one device.

9. The user terminal device of claim 8, wherein the list comprises at least one of: a name, a type, an IP address, a current status, a location, and an order of installing, regarding the device selected from the map image.

10. The user terminal device of claim 9, wherein the order of installing the device selected from the map image is changeable by a user.

11. The user terminal device of claim 8, wherein the information about the device on the map image is collected into the information collect field by a drag-and-drop manner.

12. The user terminal device of claim 1, wherein the main UI screen further comprises a map image construct menu to construct the map image.

13. A method of a user terminal device connected in a network for managing a network device, the method comprising:
   displaying a main user interface (UI) screen indicating therein a first install menu to install an application program and a second install menu to install a driver program;
   carrying out an application installation of the application program if the first install menu is selected; and
   carrying out a driver installation of the driver program if the second install menu is installed, wherein
   the carrying out of the application installation of the application program comprises, displaying a first UI screen including a map image representing a device arrangement under an environment where the network is constructed, and an application information field, and
   if a device is selected from the map image and the application program is selected from the application information field, transmitting and installing the selected application program to the selected device, and
   the carrying out the driver installation of the driver program comprises,
   displaying a second UI screen including map image, and
   if a device is selected from the map image included in the second UI, installing the driver program corresponding to the selected device onto the user terminal device;
   if a device image is selected from the map image, inactivating a displaying status of an application program which is non-installable onto the selected device, from among the application programs indicated in the application information field, and
   if an application program is selected from the application information field, inactivating a displaying status of a device which is incapable of installing the selected application program, from among the devices indicated on the map image.

14. The method of claim 13, wherein the map image represents a device image indicated at a location in which the corresponding device is placed under the network environment, and a menu to indicate information about the device is displayed on one side of the device image next to the device image.

15. The method of claim 13, wherein the carrying out the application installation comprises, if one of the devices on the map image and one of the application programs on the application information field are moved by drag-and-drop manner to another side, determining the corresponding device and the corresponding application program to be selected.

16. The method of claim 13, the carrying out the application installation further comprises, if the selected application program is already installed in the selected device, generating and displaying a user interface (UI) window to inquire as to whether the application program is to be installed or not.

17. The method of claim 13, wherein the carrying out the application installation further comprises: detecting previously stored program compatibility information; and determining compatibility between each device and application program using the program compatibility information.

18. The method of claim 13, comprising displaying on the second UI screen an information collect field to collect information about a device selected through the map image, wherein
   the carrying out the driver installation comprises,
   if the information collect field is selected, displaying a list of device information collected in the selected information collect field, and if at least one piece of device information is selected from the list, receiving at least one driver program corresponding to the selected at least one device information from an external server.

19. The method of claim 18, wherein the information about the device on the map image is collected into the information collect field by a drag-and-drop manner.

20. The method of claim 13, wherein the main UI screen further comprises a map image construct menu to construct the map image.

21. A non-transitory recording medium storing therein a program to execute a method for managing a device connected in a network, wherein the method comprises,
   displaying a main user interface (UI) screen indicating therein a first install menu to install an application program and a second install menu to install a driver program;
   if the first install menu is selected, displaying a first UI screen indicating therein a map image representing an arrangement of devices under an environment where the network is constructed, and an application information field;
   if a device is selected from the map image of the first UI screen and an application program is selected from the application information field of the first UI screen, transmitting and installing the selected application program onto the selected device;
   if the second install menu is selected, displaying a second UI screen including therein map image which indicates therein arrangement of devices under environment where the network is constructed; and
   if a device is selected from map image of the second UI screen, installing a driver program corresponding to the selected device onto a user terminal device;
   if a device image is selected from the map image, inactivating a displaying status of an application program which is non-installable onto the selected device, from among the application programs indicated in the application information field, and
   if an application program is selected from the application information field, inactivating a displaying status of a device which is incapable of installing the selected application program, from among the devices indicated on the map image.

* * * * *